United States Patent [19]

Elliott, Jr. et al.

[11] 4,427,091
[45] * Jan. 24, 1984

[54] FAIL-SAFE CIRCUIT MECHANISM FOR GENERATING A PULSE INDICATING THE PRECISE MOMENT OF FIRING OF A GAS EXHAUSTING GUN

[75] Inventors: Lloyd E. Elliott, Jr.; John L. Hudson, both of Houston, Tex.

[73] Assignee: Texaco Inc., White Plains, N.Y.

[*] Notice: The portion of the term of this patent subsequent to Jan. 6, 1998 has been disclaimed.

[21] Appl. No.: 228,433

[22] Filed: Jan. 26, 1981

Related U.S. Application Data

[63] Continuation-in-part of Ser. No. 90,158, Oct. 31, 1979, abandoned, which is a continuation-in-part of Ser. No. 913,764, Jun. 8, 1978, abandoned, and Ser. No. 59,792, Jul. 23, 1979, Pat. No. 4,243,116.

[51] Int. Cl.$^3$ .......................... G01V 1/38; G01V 1/14
[52] U.S. Cl. ..................... 181/120; 181/118; 367/144
[58] Field of Search ............... 181/107, 110, 118, 120; 367/144; 73/304 R; 340/852

[56] References Cited

U.S. PATENT DOCUMENTS

| | | | |
|---|---|---|---|
| 1,212,438 | 1/1917 | Bauder | 73/304 R |
| 3,206,615 | 9/1965 | La Pointe | 73/304 R |
| 3,503,861 | 3/1970 | Volpe | 204/195 P |
| 3,840,439 | 10/1974 | Marsh | 204/195 C |
| 4,106,585 | 8/1978 | Huizer | 181/107 |
| 4,110,740 | 8/1978 | Akita et al. | 73/304 R |
| 4,141,431 | 2/1979 | Baird | 181/118 |
| 4,165,509 | 8/1979 | Betts et al. | 73/304 R |

Primary Examiner—Richard A. Farley
Attorney, Agent, or Firm—Carl G. Ries; Robert A. Kulason; Henry C. Dearborn

[57] ABSTRACT

A new circuit is added to the old electrical circuit including two electrodes underwater positioned very close to a gas exhausting gun gaseous exhaust such as an air gun, wherein the exhaust from the firing gas exhausting gun momentarily blows away the conductive sea water from one or both of the electrodes to produce a high voltage pulse due to the large increase in resistance in the circuit indicating the precise moment of firing of the gas exhausting gun.

This new circuit added to the above circuit is a circuit polarity reversing circuit which includes particularly a positive current generator, a negative current generator, and a sea ground for forming a third electron source when any of the two electrodes becomes defective, thus forming a fail-safe system. Further, the resultant circuit changes polarity of the electrodes after each firing of the gas exhausting gun and periodically reverses the current to the electrodes for reduced plating action on the electrodes, for reduced cross coupling between other channels, and for providing a fail-safe system.

8 Claims, 2 Drawing Figures

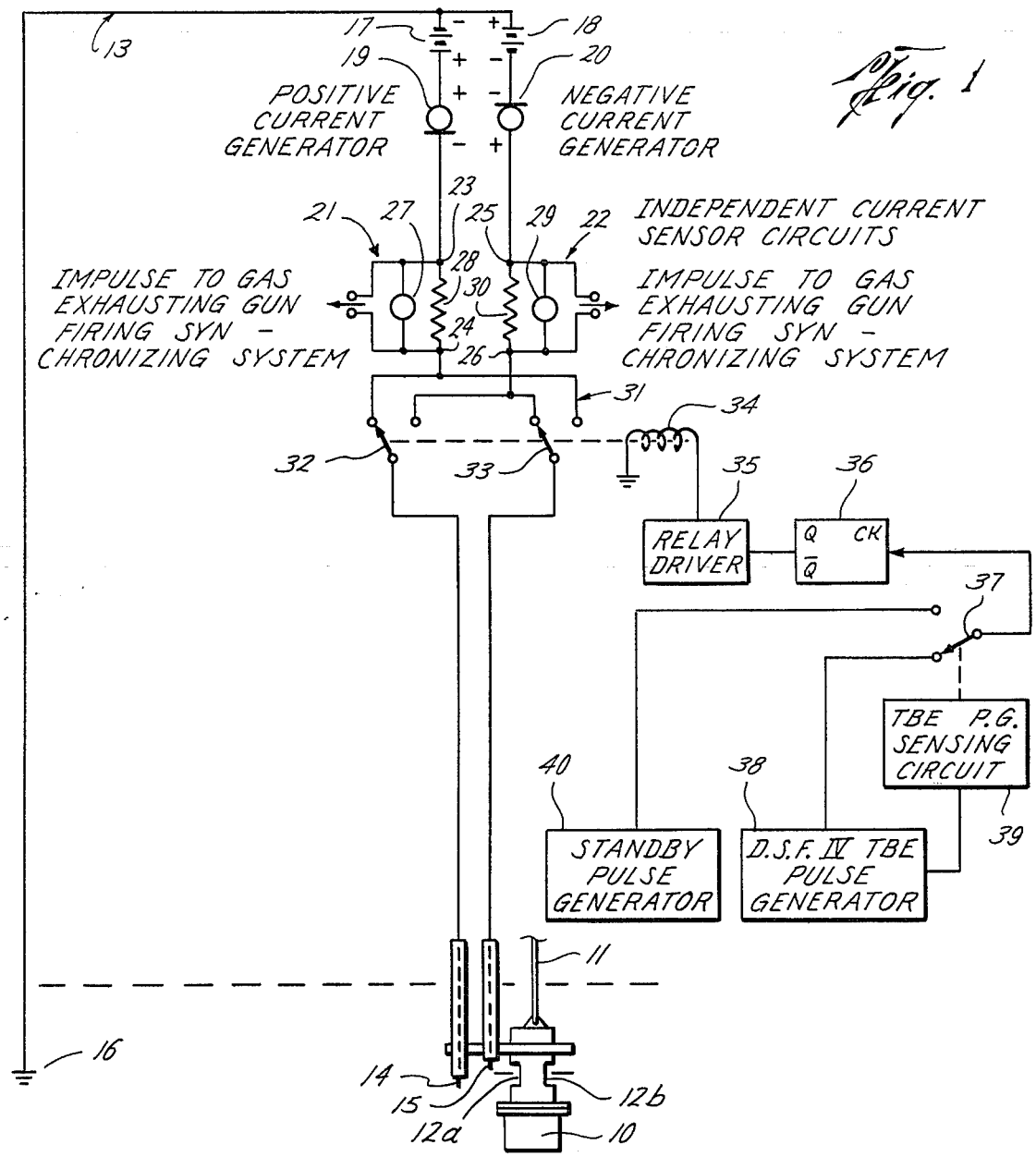
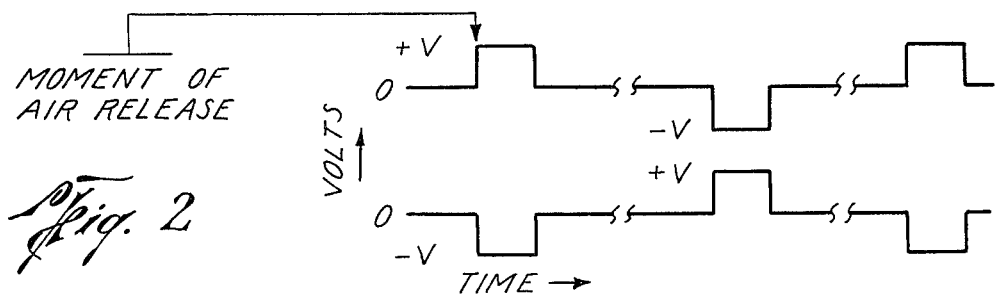
IMPULSES TO GAS EXHAUSTING OR AIRGUN
FIRING SYNCHRONIZING SYSTEM

FAIL-SAFE CIRCUIT MECHANISM FOR GENERATING A PULSE INDICATING THE PRECISE MOMENT OF FIRING OF A GAS EXHAUSTING GUN

BACKGROUND OF THE INVENTION

This is a continuation-in-part of Ser. No. 90,158, filed Oct. 31, 1979, now abandoned which is a continuation-in-part of both Ser. No. 913,764, filed June 8, 1978, now abandoned, and Ser. No. 59,792, filed July 23, 1979, now U.S. Pat. No. 4,243,116.

Marine seismic operations utilizing multiple gas exhausting guns, as an air gun, for example, requires means for precisely synchronizing the release of energy from each gun in order to optimize the composite acoustic pulse. A primary requirement of any synchronizing control system is means for detecting the precise and exact time at which gas is released from each gun for forming a seismic acoustical energy pulse.

The high pressures and adverse mechanical operating conditions prevailing in the proximity of marine gas exhausting gun energy sources to delineate the sedimentary section below greatly reduce the reliability of conventional transducers such as hydrophones, accelerometers or pressure detecting devices which might be employed to detect the instant of energy release for recording on the seismic record, such as the acoustical to electrical converter disclosed in U.S. Pat. No. 3,496,532.

We have invented a practical and reliable means for detecting the gas released from the guns or the instantaneous beginning of the seismic energy pulse.

The electrical event which results from circuitry arranged to detect this instant and momentary change of resistance is essentially free from uncertainty and mechanical noise which normally affects conventional transducers.

Conventional gas exhausting guns used as a submerged seismic energy source are illustrated in U.S. Pat. Nos. 3,379,273, 3,653,460, 3,923,122 and 4,141,431. Likewise, in a typical synchronized seismic exploration system as illustrated in U.S. Pat. No. 3,496,532, a seismic streamer cable is towed through the water to detect the acoustic reflection waves in the water generated by the detonation of the charge for converting the received reflected acoustic waves into corresponding electrical signals for the recording and processing apparatus. Thus, in the present day equipment, the time lost, as the few milliseconds travel time through the water between the gas exhausting gun and the weaving towed sound detector a few yards or meters away has to be tolerated. Since typical velocity of sound in water is 5,000 ft./sec., the travel time to a detector towed, say 10 feet away from an air gun would be 2 milliseconds.

In systems like that disclosed in U.S. Pat. No. 4,141,431, plating takes place on one of the electrodes after several firings of the air gun, and cross coupling results between channels. Also, a fail-safe system is lacking in the above patent since if either electrode became defective, the system would fail to operate.

OBJECTS OF THE INVENTION

Accordingly, a primary object of this invention comprises providing a fail-safe gas exhausting gun firing detection system that operates when either one of the two electrodes are defective.

Another object of this invention is to provide a gas exhausting gun firing detection system that reduces the plating action on the electrodes and for reducing cross coupling between other channels.

A further object of this invention is to provide a fail-safe mechanism for indicating the precise moment of firing of a gas exhausting gun that is easy to operate, is of simple configuration, is economical to build and assemble, and is of greater efficiency for producing the exact time of firing of the gas exhausting gun for extreme accuracy of synchronization in the seismic record.

Other objects and various advantages of the disclosed fail-safe mechanism for detecting the precise moment of firing of a gas exhausting gun will be apparent from the following detailed description, together with the accompanying drawings, submitted for purposes of illustration only and not intended to define the scope of the invention, reference being made for that purpose to the subjoined claims.

BRIEF DESCRIPTION OF THE DRAWINGS

The drawing diagrammatically illustrates by way of example, not by way of limitation, one form of the invention wherein like reference numerals designate corresponding parts in the several views in which:

FIG. 1 is a schematic diagrammatic elevation view of the complete mechanism including the novel circuitry; and FIG. 2 is a time versus voltage output curve of the disclosed system.

The invention disclosed herein, the scope of which being defined in the appended claims is not limited in its application to the details of construction and arrangement of parts shown and described, since the invention is capable of other embodiments and of being practiced or carried out in various other ways. Also, it is to be understood that the phraseology or terminology employed here is for the purpose of description and not of limitation. Further, many modifications and variations of the invention as hereinbefore set forth will occur to those skilled in the art. Therefore, all such modifications and variations which are within the spirit and scope of the invention herein are included and only such limitations should be imposed as are indicated in the appended claims.

FIG. 1 illustrates a seismic gas exhausting gun, as an explosive gun or a pneumatic energy source, such as but not limited to, a submerged air gun 10 supported with a line 11 from a boat (not shown) above. This seismic energy source also may be any one of various other gas exhausting guns, as a gas exploder that discharges a gas or air bubbles at a controlled location. The gas exhausting gun 10 has exhaust ports 12a and 12b. The below described exemplary gas exhausting gun firing detector may be manufactured, formed, or assembled by the methods disclosed in our co-pending patent application Ser. No. 228,432, filed simultaneously herewith on Jan. 26, 1981. While various gas exhausting guns and circuits may be utilized with the new concept disclosed hereinafter, only one gas exhausting gun and one circuit therefor is disclosed for clarity of disclosure in the delineation of the sedimentary section below.

The gun 10 may be any type that when fired underwater, the expulsion or replacement of water is done by a medium having a conductivity different from that of water.

Since this medium is usually a gas resulting from an explosion or implosion, the term "gas exhausting gun" is intended to cover all mediums other than water resulting from a seismic energy source. Even a vacuum cavitation left behind a mass moving very rapidly through the water generates a vapor which is thus similar to the implosion of an air gun which is a gas exhausting gun.

There is a proliferating spectrum of seismic energy sources including explosives as dynamite, black powder, gun powder, ammonium nitrate, AQUAFLEX*, AQUASEIS*, FLEXOTIR*, and PRIMACORD*, electric sparkers as BOOMERS*, PINGERS*, SONOPROBE*, SSP*, and WASSP*, gas exploders as AQUAPULSE*, DINOSEIS*, DUSS*, and GASSP*, air guns as AIRDOX*, CARDOX*, HYDRO-SEIN*, PAR*, PNEUMATIC ACOUSTIC ENERGY SOURCE*, and SEISMOJET*, etc., in addition to cracklers, magneto-hydrodynamic bangers, poppers, slappers, snappers, water hammers, and the underwater chirper system, VIBROSEIS*. Because of various economic, technological, ecological, and political reasons, the air gun type of alternative energy source is the most prevalent at this time.

| * - NAMES AND TRADE-MARKS | |
|---|---|
| AIRDOX | Trademark of Long-Airdox Company, a Division of Marmon-Herrington Co., Inc., Oak Hill, West Virginia. |
| AQUAFLEX | Trademark of Imperial Chemical Industries, Ltd., High Energy "Seismic Cord" for Linear Sources. |
| AQUAPULSE | Trademark and Service Mark of Western Geophysical Company of America, 8100 Westpark Drive, Houston, Texas 77042. Licensee of Esso Production Research Company. |
| AQUASEIS | Name of Linear Energy Source. Imperial Chemical Industries, Ltd., Nobel Division, Stevenson, Ayrshire, Scotland. |
| BOOMER | Trademark of EG&G International, 95 Brookline Avenue, Boston, Massachusetts 02215. |
| CARDOX | Trademark of Long-Airdox Company. |
| DINOSEIS | Registered Trademark of Sinclair Research, Inc., Gas Exploder Sound Source. |
| DUSS | Trademark of Mobil Oil Company Corporation Diesel Underwater Seismic Source. |
| FLEXOTIR | Trademark of Institut Francais du Petrole, Sound Source licensed by Chevron Research & Development. |
| GASSP | Trademark of Shell Development Company, Gas Source Seismic Profiler, Licensed to Teledyne Exploration, 3401 Shiloh Road, Garland, Texas. |
| HYDRO-SEIN | Originally the Trademark of Marine Geophysical Services - Now a part of Western Geophysical Company of America, Implosive Sound Source. |
| PAR | Trademark of Bolt Associates, Inc., Pneumatic Sound Source System, 10 Fitch Street, Norwalk, Connecticut 06855. |
| PINGER | Manufactured by EG&G International. |
| PNEUMATIC ACOUSTIC ENERGY SOURCE | Geophysical Service, Inc., Science Services Division, Texas Instruments, Inc. Name of Air Gun System, Texas Instruments, Inc., 6000 Lemmon Avenue, Dallas, Texas 75222. |
| PRIMACORD | Trademark of Ensign-Bickford Company, Simsbury, Connecticut. |
| SEISMOJET | High Pressure Air Gun of Trojan-U.S. Powder, Manufactured and Distributed by SIE-Dresser Systems, 10201 Westheimer, Houston, Texas 77001. |
| SONO-PROBE | Trademark of Mobil Oil Corporation. |
| SPARKARRAY | Trademark of EG&G International. |
| SSP | Trademark of Teledyne Exploration, A Teledyne Company, Seismic Section Profiler System. |
| VIBROSEIS | Trademark and Service Mark of Continental Oil Company, Continuous Sound Source. |
| WASSP | Trademark of Teledyne Exploration. A Teledyne Company, Wire Arc Seismic Section Profiler System. |

FIG. 1 also illustrates the novel circuit 13 for powering the two electrodes 14 and 15. This new circuit comprises a sea ground 16, having a direct current electrical source 17 and 18, and a positive current generator 19 and a negative current generator 20, each connected to independent current sensor circuits 21 and 22, respectively. Both detectors 21 and 22 have pairs of output contacts 23, 24 and 25, 26, respectively, for transmission of signal pulses to a gas exhausting gun firing synchronizing and record system (not shown). Current sensor 21 comprises a voltage meter 27, and a resistor 28. A current sensor 22 similarly includes a voltage meter 29 and a resistor 30.

A gun switch 31 is connected between the independent current sensor circuits 21, 22 and the two electrodes 14, 15. Switch 31 comprises relay contacts 32 and 33 operated by relay 34, which relay is driven by relay driver 35 responsive to flip-flop clock 36. In normal operation electronic switch 37 connects flip-flop clock 36 to the digital field system time break enable pulse generator 38 which supplies power to relay driver 35 for energizing a relay 34 which operates switch 31 which switches the polarity of the current supplied to each of the electrodes.

If no shots are fired in a pre-selected period of time, then the T.B.E. (Time Break Enable) pulse generator sensing circuit 39 operates electronic switch 37 so that 40 can supply voltage pulses to the flip-flop clock 36 which causes the polarity of the current supplied to electrodes 14 and 15 to change during extended periods of time when no gas exhausting gun shots are being fired. Switch 37 may be switched electronically or manually to either standby pulse generator 40 or D.F.S. IV (Digital Field System) T.B.E. pulse generator 38 for supplying the triggering pulses to flip-flop 36 which supplies the control voltage to relay driver 35 which in turn supplies the power to relay 34 which controls the polarity of the current signals supplied to electrodes 14 and 15.

The electrodes 14 and 15 protrude through and are secured to a flange on the top of the gas exhausting gun 10 to position them very close to or contiguous to one of the gas exhausting gun exhaust ports 12a to ensure that the first portion of the acoustical wave or initial blast of exhaust gases from the gas exhausting gun exhaust port blows the water away from between the electrodes 14 and 15. The sea ground 16 acts electronically as a third electrode. The term "very close to" meaning, for example, a distance or less than a fraction of an inch or centimeter, or as close as mechanically and economically possible. Thus the time lag between the time when the pulse generating gas bubble emerges from the gas exhausting gun exhaust port and the time that the synchronizing system receives the electrical pulse is the time it takes for the gas bubble to travel from the exhaust port to the position between the two electrodes added to the time it takes for the electrical voltage pulse to travel from the output terminals to the synchronizing record system.

FIG. 2, a time versus voltage output curve shows two typical simultaneous, positive and negative voltage pulses at the moment of gas release from the gas exhausting gun for being transmitted to the gas exhausting gun firing synchronizing system.

Thus briefly in operation of the embodiment of FIG. 1, the low interelectric voltage exists due to the current flowing in the circuit when the two electrodes 14 and 15 are submerged in the sea water and positioned very close to the gas exhausting gun, and with the sea water completing the circuit and creating a low resistance between the two electrodes. Also, the sea ground 16 completes the circuit for causing a flow of electrons to both circuits 21 and 22. Upon firing of the gas exhausting gun, the first acoustical wave or blast of the exhaust gases displaces the water with gas from between the two electrodes momentarily. That moment of insertion of a high resistance to current flow between the electrodes generates a voltage pulse for transmitting the precise moment of firing of the gas exhausting gun to the synchronizing and recording systems, for example.

When a gas exhausting gun 10 fires and opens the seashort or current path between the electrodes 14 and 15, this induces two impulses to the gas exhausting gun firing synchronizing system (not shown).

After the gas bubble has dissipated which takes a short period of time indicated by the length of the pulse in FIG. 2 after the moment of release, the current path between the electrodes 14 and 15 is again closed.

Prior to the next gas gun shot the Digital Field System Model #IV (by Texas Instruments, Inc., Houston, Tex.), T.B.E. (Time Break Enable) standby pulse generator 38 generates a pulse to switch 37 and through to flip-flop clock 36 which causes the relay driver 35 to switch relay 34 to a different state and thus actuating switches 32 and 33 for reversing the polarity of the electrodes 14 and 15.

Or after a predetermined period of time has passed when the gas exhausting gun has not fired, T.B.E.P.G. (Time Break Enable Pulse Generator) sensing circuit 39 detects no firing within this predetermined time period and actuates switch 37 to the standby pulse generator 40. Being that pulse generator 40 generates pulses on a regular basis at short predetermined time periods, it generates pulses to flip-flop clock 36 which reverses the state of polarity of the relay driver 35 which actuates relay 34 for changing the position at switches 32 and 33 reversing the polarity of the currents supplied electrodes 14 and 15.

The results are:
1. Less plating action on the electrodes.
2. Reduced noise and cross coupling between other channels due to equal and opposite polarity contents being supplied to the electrodes 14 and 15.
3. A more reliable fail-safe system due to the use of a third electrode or sea ground 16 as a backing electrode when any one of the two normal electrodes, 14 and 15, fail.

Accordingly, it will be seen that a mechanism has been disclosed for generating a pulse indicating the precise moment of firing of a gas exhausting gun, and it will operate in a manner which meets each of the objects set forth hereinbefore.

While only one mechanism for carrying out the invention has been disclosed, it will be evident that various modifications are possible in the arrangement and construction of the disclosed mechanism without departing from the scope of the invention and it is accordingly desired to comprehend within the purview of this invention such modifications as may be considered to fall within the scope of the appended claims.

We claim:

1. An indicator for detecting the precise moment of firing of a gas exhausting gun means for a seismic record comprising,
   (a) circuit means for generating a current to two closely spaced apart electrodes submerged underwater very close to gas exhausting gun means exhaust port, and
   (b) said circuit means including a sea ground as a backup electrode when any one of the two electrodes becomes defective for providing a fail-safe indicator.

2. An indicator for detecting the precise moment of firing of a gas exhausting gun means for a seismic record having two closely spaced apart electrodes submerged underwater very close to a gas exhausting gun means exhaust port means comprising,
   (a) circuit means including a sea ground as a backup electrode when any one of the two electrodes becomes defective for providing a fail-safe indicator,
   (b) said circuit means including a polarity reversing means for said electrodes, and
   (c) said circuit means being responsive to said polarity reversing means for periodically reversing said current to said two electrodes after a predetermined period of time for reducing plating action on the electrodes, for reducing cross coupling between other channels, and for providing a fail-safe system.

3. A circuit as recited in claim 2 wherein,
   (a) said polarity reversing means for said gas exhausting gun means comprises two interconnected switches in the circuit between said two electrodes and two independent current sensor circuits, and
   (b) positive and negative current generators between said independent current sensor circuits and said sea ground for reducing plating action of the currents on the electrodes.

4. A circuit as recited in claim 2 wherein said polarity reversing means comprises,
   (a) relay driven means for said gas exhausting gun means being responsive to a flip-flop clock for operating a gang switch for switching said two electrodes between positive and negative current generator circuits.

5. A circuit as recited in claim 2 wherein said polarity reversing means comprises,
   (a) gang switch means for said gas exhausting gun means being responsive to a relay driven means for switching said two electrodes between positive and negative current generator circuits.

6. A circuit as recited in claim 2 wherein said polarity reversing means comprises at least,
   (a) digital field system pulse generator means for said gas exhausting gun means for generating a signal pulse for reversing said current to said two electrodes.

7. A circuit as recited in claim 2 wherein said polarity reversing means comprises,
   (a) positive current generator means and negative current generator means for said gas exhausting gun means for generating a positive current to either one of said electrodes and generating a negative current to the other of said electrodes, respectively.

8. An indicator for detecting the precise moment of firing of a submerged seismic gun means for expelling a medium having a conductivity different from the surrounding water comprising,
   (a) circuit means for generating a current to two closely spaced apart electrodes submerged underwater very close to a medium exhaust port exhausting seismic gun means for detecting the different conductivity of the expelled medium from the surrounding water upon firing of the seismic gun means, and
   (b) said circuit means including a sea ground as a backup electrode when any one of said two electrodes become defective for providing a fail-safe indicator.

* * * * *